3,132,172
CYANOALKYL ETHERS OF 4,4'-ALKYLIDENEDI-CYCLOHEXANOLS
Charles J. Eby, North Springfield, Va., assignor to Monsanto Chemical Company, St. Louis, Mo., a corporation of Delaware
No Drawing. Filed Apr. 16, 1962, Ser. No. 187,984
2 Claims. (Cl. 260—464)

This invention relates to alkylidene dicyclohexanol derivatives, and more particularly provides some new and useful cyanoalkyl ethers of 4,4'-alkylidenedicyclohexanols.

It is an object of this invention to provide new cyanoalkyl ethers from cyclic aliphatic diols. It is another object of this invention to provide cyanoalkyl ethers from 4,4'-alkylidenedicyclohexanols. It is another object of this invention to provide a process for preparing cyanoalkyl ethers from cyclic aliphatic diols and alkenylnitriles. Another object of this invention is to provide new and useful compounds for use in making diacids, diamines, diamides, diesters, polyamides, etc. Other objects and advantages of this invention will become apparent from a reading of the accompanying description and the appended claims.

This invention provides new compounds which may be represented by the following general formula:

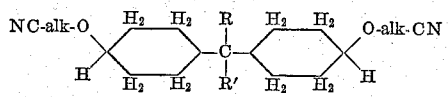

wherein R and R' are lower alkyl radicals, and alk denotes a lower alkylene radical. The term "lower alkylene" in the above general formula refer to the lower aliphatic divalent saturated radicals. The lower alkyl groups in R and R' may be straight chained or branched.

Another aspect of this invention is to provide a process for preparing compounds of the above type by reacting a compound having the structure

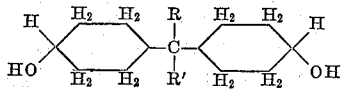

wherein R and R' are as defined above with an alkenenitrile. The preferred compound of this class is 4,4'-isopropylidenedicyclohexanol. However the other compounds of the same general class may also be used with good results, for example, compounds obtained by condensing a ketone such as 2-butanone, 2-pentanone, 3-pentanone, 4-hexanone, 3-heptanone, 5-octanone, 4-nonanone, 7-dodecanone, etc., with phenol, and then hydrogenating the thus obtained product with hydrogen in the presence of a suitable hydrogenated catalyst. Although alkylidenedicyclohexanol compounds having the hydroxyl group in the para position to the alkylidene linkage are preferred, compounds having the hydroxyl groups in the meta position may also be used.

Such alkylidenedicyclohexanol compounds are reacted with an alkene nitrile compound of the formula

R''—CN wherein R'' denotes a lower straight or branched chain alkenyl radical having from 2 to 8 carbon atoms. Preferred nitriles of this type include acrylonitrile, methacrylonitrile, 2-pentenenitrile, 2-hexenenitrile, and 2-octenenitrile.

The molar ratio of the alkenenitrile to the alkylidenedicyclohexanol compounds utilized in carrying out the reaction of this invention may be varied widely. Effective results are obtained when about 4.0 moles of the alkenenitrile are utilized per mole of the alkylidenedicyclohexanol compound. Under most conditions, a ratio of about 6 moles of the nitrile to one mole of the alkylidenedicyclohexyl is considered optimum. However, the ratio may be as low or lower than 0.5 to 1.0 or as high as or higher than 5.0 to 10 moles. In carrying out the reaction of this invention it is not necessary to use a solvent or diluent, but solvents such as tetrahydrofuran, tertiary-butanol, or any suitable polar solvent may be used. In some cases excess of the alkenenitrile reactant may be used as solvent. However, higher yields are usually obtained when solvents such as tetrahydrofuran are employed.

The use of catalysts is preferred. Basic catalysts may be used. Examples of basic catalysts which may be used are alkali metals, alkali metal hydrides, alkali metal alcoholates, etc., such as sodium and potassium metals, sodium and potassium hydrides, sodium and potassium methylate, ethylate, propanonate. Other catalysts that may be used include a copper catalyst such as cupric acetate, cuprous acetate, cupric sulfate, cuprous sulfate, cuprous hydroxide, basic cupric carbonate, etc.

Temperatures on the order of from about room temperatures (20° C.) to about 200° C. may be used with temperatures on the order of from 50° C. to 150° C. being preferred. Exothermic heating may be necessary with the more sluggish alkenenitriles but in most cases the reaction is at least slightly exothermic so that external heating may be discontinued once the reaction has set in.

The following examples illustrate more fully the preparation of the cyanoalkyl ethers of this invention. The examples are not, however, intended to limit the scope of the invention but there are of course numerous possible variations and modifications.

*Example 1*

To 240 g. (1.0 mole) of 4,4'-isopropylidenedicyclohexanol 400 mm. of tetrahydrofuran, and 2.3 g. of 50% sodium hydride in a mineral oil dispersion there was added 212 g. (4.0 moles) of acrylonitrile at a dropwise rate while heating the mixture to reflux. When the addition was completed the solution was refluxed for an additional 3 hours. The reaction mixture was acidified with 2 ml. of concentrated sulfuric acid, filtered under vacuum, and the filtrate was concentrated to 135° C./0.1 mm. to give 329 g. a thick dark oil. The oil was diluted with 1 liter of diethyl ether, filtered, and concentrated to 100° C./15 mm. to leave as residue 246 g. of 3,3'-(4,4' - isopropylidenedicyclohexyloxy)bispropanenitrile as a clear thick golden oil, $N_D^{25.5}$ 1.4952. After the oil had crystallized the solid was triturated with ether. A crystalline solid, M.P. 94 to 97° C., remained which analyzed as containing 72.91% carbon, 10.04% hydrogen, and 7.92% nitrogen as compared with 72.9% carbon, 9.85% hydrogen, and 8.08% nitrogen the calculated values for $C_{21}H_{34}N_2O_2$.

*Example 2*

Using the procedure of Example 1, except that 2-pentenenitrile is used in place of acrylonitrile, there is obtained 3,3' - (4,4' - isopropylidenedicyclohexyloxy)bispentanenitrile.

*Example 3*

Repeating the procedure of Example 1, with the exception that 3,3'-(2,2'-butylidene)dicyclohexanol is used in place of 4,4'-isopropylidenedicyclohexanol, there is obtained 3,3'-[3,3'-(2,2-butylidene)dicyclohexyloxy]bispropanenitrile.

The cyanoalkyl ether products of this invention obtained in the foregoing manner can be used as intermediates for preparing other difunctional molecules such as diamines, diacids, etc. which are useful for forming condensation polymers such as polyamides, polyesters, etc. For example, by hydrogenating a compound of this invention there is obtained the respective diamine compound which is useful for making polyamide polymers such as is obtained by reacting dimethyl adipate with 3,3'-(isopropylidenedicyclohexyloxy)bis(propaneamine) obtained by hydrogenating 3,3'-(isopropylidenedicyclohexyloxy)bis(propanenitrile).

Although specific examples of this invention have been set forth hereinabove, it is not intended that the invention be limited solely thereto but to include all the variations and modifications falling within the scope of the appended claims.

I claim:
1. A compound of the formula

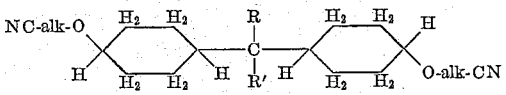

wherein R and R' are lower alkyl radicals and alk denotes an alkylene radical having two carbon atoms between the oxygen and —CN moieties of the compound, and a total of from 2 to 8 carbon atoms.

2. 3,3' - (4,4' - isopropylidenedicyclohexyloxy)bis(propanenitrile).

References Cited in the file of this patent
Bruson: "Organic Reactions," vol. 5, pages 89–93.